(12) United States Patent
Tenny et al.

(10) Patent No.: US 12,295,072 B2
(45) Date of Patent: May 6, 2025

(54) SYSTEM AND METHOD FOR UPDATING USER EQUIPMENT CAPABILITY

(71) Applicant: Futurewei Technologies, Inc., Addison, TX (US)

(72) Inventors: Nathan Edward Tenny, San Diego, CA (US); Jian Wang, Beijing (CN); Haibo Xu, Beijing (CN)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 0 days.

(21) Appl. No.: 18/301,317

(22) Filed: Apr. 17, 2023

(65) Prior Publication Data

US 2023/0328511 A1  Oct. 12, 2023

Related U.S. Application Data

(63) Continuation of application No. 17/552,186, filed on Dec. 15, 2021, now Pat. No. 11,653,196, which is a
(Continued)

(51) Int. Cl.
*H04W 8/22* (2009.01)
(52) U.S. Cl.
CPC ..................... *H04W 8/22* (2013.01)
(58) Field of Classification Search
CPC ......... H04W 28/0257; H04W 28/0263; H04W 28/0268; H04W 52/0261; H04W 52/0264;
(Continued)

(56) References Cited

U.S. PATENT DOCUMENTS 9,253,729 B1   2/2016 Sundar et al.
2008/0046132 A1* 2/2008 Dalsgaard ............. H04L 1/0025
                                              700/299
(Continued)

FOREIGN PATENT DOCUMENTS

CN   102378403 A   3/2012
CN   104584648 A   4/2015
(Continued)

OTHER PUBLICATIONS

"3rd Generation Partnership Project; Technical Specification Group Radio Access Network; Evolved Universal Terrestrial Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 v14.1.0, Dec. 2016, 317 pages.
(Continued)

*Primary Examiner* — Huy C Ho
(74) *Attorney, Agent, or Firm* — Slater Matsil, LLP

(57) ABSTRACT

A method for operating a user equipment (UE) includes detecting an occurrence of an overheating condition in the UE, and based thereon, determining a first set of operating capabilities of the UE from a second set of operating capabilities of the UE, where the first and second set of operating capabilities are associated with a connection between the UE and a network entity, and where the first set of operating capabilities is a reduction in operating capability of the UE when compared to the second set of operating capabilities, triggering a transfer of UE capability information associated with the first set of operating capabilities, and applying, by the UE, the first set of operating capabilities to the connection.

19 Claims, 8 Drawing Sheets

Related U.S. Application Data continuation of application No. 15/691,940, filed on Aug. 31, 2017, now Pat. No. 11,234,119.

(60) Provisional application No. 62/444,414, filed on Jan. 10, 2017.

(58) Field of Classification Search
CPC ......... H04W 52/0274; H04W 52/0277; H04W 52/028; H04W 52/0283; H04W 52/0287; H04W 52/029; H04W 8/22
USPC ........................................................ 455/418
See application file for complete search history.

(56) References Cited

U.S. PATENT DOCUMENTS

| | | |
|---|---|---|
| 2012/0004067 A1 | 2/2012 | Chen |
| 2014/0321304 A1 | 10/2014 | Yu et al. |
| 2016/0127998 A1* | 5/2016 | Roessel ............. H04W 52/0277 370/311 |
| 2016/0157228 A1 | 6/2016 | Yum et al. |
| 2016/0174159 A1 | 6/2016 | Ljung |
| 2016/0239057 A1 | 8/2016 | Kocagoez |
| 2016/0262143 A1 | 9/2016 | Breuer et al. |
| 2017/0164220 A1 | 6/2017 | Roessel et al. |
| 2017/0205365 A1 | 7/2017 | Cavallaro et al. |

FOREIGN PATENT DOCUMENTS

| | | |
|---|---|---|
| CN | 105103631 A | 11/2015 |
| CN | 105325035 A | 2/2016 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.9.0, Jun. 2009, 159 pages.

"3rd Generation Partnership Project; Technical Specification Group Radio Access Network; Evolved Universal Terrestrial Radio Access (E-UTRA); User Equipment (UE) radio access capabilities (Release 14)," 3GPP TS 36.306 V14.1.0, Dec. 2016, 65 pages.

"3rd Generation Partnership Project; Technical Specification Group Radio Access Network; Evolved Universal Terrestrial Radio Access (E-UTRA); Radio Resource Control (RRC); Protocol Specification (Release 14)," 3GPP TS 36.331 V14.1.0, Dec. 2016, 654 pages.

"3rd Generation Partnership Project; Technical Specification Group Radio Access Network; Evolved Universal Terrestrial Radio Access (E-UTRA) Radio Resource Control (RCC); Protocol specification (Release 8)," 3GPP TS 36.331, V8.6.0, Technical Specification, Jun. 2009, 207 pages.

Ericsson, "UE capability principle and signalling", 3GPP TSG-RAN WG2 NR Ad Hoc, Tdoc R2-1700491, Spokane, USA, Jan. 17-19, 2017, 4 pages.

"Universal Mobile Telecommunications System (UMTS); Radio Resource Control (RRC); Protocol specification (3GPP TS 25.331 version 7.7.0 Release 7)," ETSI TS 125 331 V7.7.0, Technical Specification, Jan. 2008, 1468 pages.

Ericsson, "UE capability principle and signalling", 3GPP TSG-RAN WG2 #96, TDoc R2-168297, Nov. 14-18, 2016, 4 Pages, Reno, Nevada.

Ericsson, "UE capability principle and signalling", 3GPP TSG-RAN WG2 #95bis, Tdoc R2-166782, Oct. 10-14, 2016, 4 Pages, Kaohsiung, Taiwan.

Qualcomm Europe, et al., "Update and draft CR on change of UE capability during RRC connection," 3GPP TSG-RAN WG2 #60, Agenda item 7.3.14, R2-074734, Jeju Korea, Nov. 5-9, 2007, 41 pages.

Qualcomm Europe, "Change of UE capability," 3GPP TSG RAN WG 2 LTE RRC ad-hoc, Agenda item 3.1.1, R2-075544, Vienna, Austria, Dec. 13-14, 2007, 4 pages.

Qualcomm Europe, "UE capability updates while attached," 3GPP TSG-RAN WG2 #63, Agenda item 6.2.1.6, R2-083878, Jeju Island, Korea, Aug. 18-22, 2008, 5 pages.

Philips, "Capabilities of multi-transceiver UEs," 3GPP TSG RAN WG2 #70bis, R2-103922, Agenda item 7.4, Stockholm, Sweden, Jun. 28-Jul. 2, 2010, 3 pages.

Qualcomm, Inc., "UE overheating problem," 3GPP TSG-RAN WG2 Meeting #99, R2-1708978, Berlin, Germany, Aug. 21-25, 2017, 5 pages.

\* cited by examiner

SYSTEM AND METHOD FOR UPDATING USER EQUIPMENT CAPABILITY

This application is a continuation of U.S. Non-Provisional application Ser. No. 17/552,186, filed on Dec. 15, 2021, now U.S. Pat. No. 11,653,196 issued on May 16, 2023, entitled "System and Method for Updating User Equipment Capability," which is a continuation of U.S. Non-Provisional application Ser. No. 15/691,940, filed on Aug. 31, 2017, now U.S. Pat. No. 11,234,119 issued on Jan. 25, 2022, entitled "System and Method for Updating User Equipment Capability," which claims the benefit of U.S. Provisional Application No. 62/444,414, filed on Jan. 10, 2017, entitled "System and Method for Updating User Equipment Capability," both of which application applications of which are hereby incorporated by reference.

TECHNICAL FIELD

The present disclosure relates generally to a system and method for digital communications, and, in particular embodiments, to a system and method for updating user equipment (UE) capability.

BACKGROUND

Future wireless communications systems are supporting user equipments (UEs) with greater capabilities (e.g., maximum data rate, number of supported carriers in carrier aggregation (CA), number of antennas in multiple input multiple output (MIMO) operation, and so on). However, the increased capabilities come with additional processing requirements. In some situations, the additional processing required to support the increased capabilities leads to overheating of the UE, which may have difficulty dissipating the heat due to UE packaging limitations.

SUMMARY

Example embodiments provide a system and method for updating user equipment (UE) capability.

In accordance with an example embodiment, a method for operating a user equipment (UE) is provided. The method includes detecting, by the UE, an occurrence of an overheating condition in the UE, and based thereon, determining, by the UE, a first set of operating capabilities of the UE from a second set of operating capabilities of the UE, where the first and second set of operating capabilities are associated with a connection between the UE and a network entity, and where the first set of operating capabilities is a reduction in operating capability of the UE when compared to the second set of operating capabilities, triggering, by the UE, a transfer of UE capability information associated with the first set of operating capabilities, and applying, by the UE, the first set of operating capabilities to the connection.

Optionally, in any of the preceding embodiments, wherein triggering the transfer of the UE capability information comprises transmitting a message including the UE capability information to the network entity.

Optionally, in any of the preceding embodiments, wherein the UE capability information comprises information associated with an entirety of the first set of operating capabilities.

Optionally, in any of the preceding embodiments, wherein the UE capability information comprises information associated with operating capabilities of the first set of operating capabilities that differs from the second set of operating capabilities.

Optionally, in any of the preceding embodiments, wherein the message comprises a radio resource control (RRC) message.

Optionally, in any of the preceding embodiments, wherein the message is one of an instance of a UE capability message, a special purpose message conveying the UE capability information associated with operating capabilities of the first set of operating capabilities, or an existing message with one or more additional information elements (IEs) conveying the UE capability information associated with operating capabilities of the first set of operating capabilities.

Optionally, in any of the preceding embodiments, wherein triggering the transfer of the UE capability information comprises transmitting an indicator indicating to the network entity to request the UE capability information.

Optionally, in any of the preceding embodiments, wherein the indicator is transmitted in one of an RRC message or a medium access control (MAC) control element (CE).

Optionally, in any of the preceding embodiments, wherein applying the first set of operating capabilities occurs after at least one of the UE receives reconfiguration information compatible with the first set of operating capabilities, the UE receives a configuration change indicator indicating that the UE capability information is acceptable, or an elapsing of a specified amount of time after the UE triggered the transfer of the UE capability information without the UE receiving the reconfiguration information compatible with the first set of operating capabilities or the configuration change indicator.

Optionally, in any of the preceding embodiments, wherein applying the first set of operating capabilities occurs after the UE receives reconfiguration information compatible with the first set of operating capabilities, or a configuration change indicator indicating that the UE capability information is acceptable, and wherein the method further includes detecting, by the UE, that a specified amount of time has elapsed after the UE triggered the transfer of the UE capability information without the UE receiving the reconfiguration information compatible with the first set of operating capabilities or the configuration change indicator, and based thereon, detaching, by the UE, from the network entity, and reattaching, by the UE, to the network entity in accordance with the first set of operating capabilities.

In accordance with an example embodiment, a UE is provided. The UE includes a processor, and a computer readable storage medium storing programming for execution by the processor. The programming including instructions to configure the UE to detect an occurrence of an overheating condition in the UE, and based thereon, determine a first set of operating capabilities of the UE from a second set of operating capabilities of the UE, where the first and second set of operating capabilities are associated with a connection between the UE and a network entity, and where the first set of operating capabilities is a reduction in operating capability of the UE when compared to the second set of operating capabilities, trigger a transfer of UE capability information associated with the first set of operating capabilities, and apply the first set of operating capabilities to the connection.

Optionally, in any of the preceding embodiments, wherein the programming includes instructions to configure the UE to transmit a message including the UE capability information to the network entity.

Optionally, in any of the preceding embodiments, wherein the programming includes instructions to configure the UE to transmit an indicator indicating to the network entity to request the UE capability information.

Optionally, in any of the preceding embodiments, wherein the UE applies the first set of operating capabilities after at least one of the UE receives reconfiguration information compatible with the first set of operating capabilities, the UE receives a configuration change indicator indicating that the UE capability information is acceptable, or an elapsing of a specified amount of time after the UE triggered the transfer of the UE capability information without the UE receiving the reconfiguration information compatible with the first set of operating capabilities or the configuration change indicator.

Optionally, in any of the preceding embodiments, wherein the UE applies the first set of operating capabilities after the UE receives reconfiguration information compatible with the first set of operating capabilities, or a configuration change indicator indicating that the UE capability information is acceptable, and wherein the programming includes instructions to detect that a specified amount of time has elapsed after the UE triggered the transfer of the UE capability information without the UE receiving the reconfiguration information compatible with the first set of operating capabilities or the configuration change indicator, and based thereon, detach from the network entity, and reattach to the network entity in accordance with the first set of operating capabilities.

In accordance with an example embodiment, a non-transitory computer-readable medium storing programming for execution by one or more processors is provided. The programming including instructions to detect an occurrence of an overheating condition in a UE, and based thereon, determine a first set of operating capabilities of the UE from a second set of operating capabilities of the UE, where the first and second set of operating capabilities are associated with a connection between the UE and a network entity, and where the first set of operating capabilities is a reduction in operating capability of the UE when compared to the second set of operating capabilities, trigger a transfer of UE capability information associated with the first set of operating capabilities, and apply the first set of operating capabilities to the connection.

Optionally, in any of the preceding embodiments, wherein the programming includes instructions to transmit a message including the UE capability information to the network entity.

Optionally, in any of the preceding embodiments, wherein the programming includes instructions to transmit an indicator indicating to the network entity to request the UE capability information.

Optionally, in any of the preceding embodiments, wherein the UE applies the first set of operating capabilities after at least one of the UE receives reconfiguration information compatible with the first set of operating capabilities, the UE receives a configuration change indicator indicating that the UE capability information is acceptable, or an elapsing of a specified amount of time after the UE triggered the transfer of the UE capability information without the UE receiving the reconfiguration information compatible with the first set of operating capabilities or the configuration change indicator.

Optionally, in any of the preceding embodiments, wherein the UE applies the first set of operating capabilities after the UE receives reconfiguration information compatible with the first set of operating capabilities, or a configuration change indicator indicating that the UE capability information is acceptable, and wherein the programming includes instructions to configure the UE to detect that a specified amount of time has elapsed after the UE triggered the transfer of the UE capability information without the UE receiving the reconfiguration information compatible with the first set of operating capabilities or the configuration change indicator, and based thereon, detach from the network entity, and reattach to the network entity in accordance with the first set of operating capabilities.

Practice of the foregoing embodiments enables a UE to dynamically update the UE capability to reduce processing requirements, and therefore, heat dissipation requirements, without having to detach and re-attach to the network, which would lead to service interruptions.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
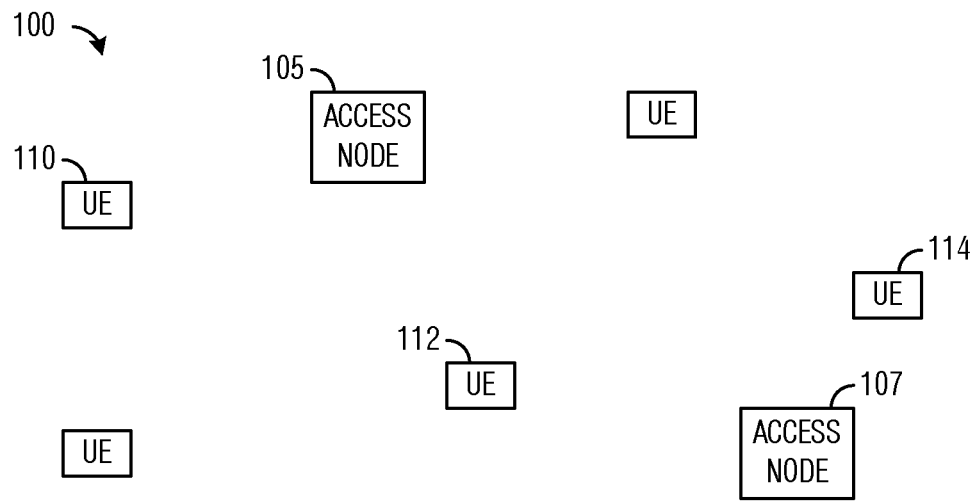
FIG. 1 illustrates an example wireless communications system according to example embodiments described herein.

FIG. 1 illustrates an example wireless communications system 100. Communications system 100 includes access nodes, such as access node 105 and access node 107, serving user equipments (UEs), such as UEs 110, 112, and 114. A single UE may be served by one or more access nodes. In an example operating mode, transmissions for UEs as well as transmissions by UEs pass through the access nodes. The access nodes allocate resources for the transmissions to or from the UEs.

While it is understood that communications systems may employ multiple access nodes capable of communicating with a number of UEs, only two access nodes, and five UEs are illustrated for simplicity.

Access nodes may also be commonly referred to as NodeBs, evolved NodeBs (eNBs), next generation (NG) Node Bs (gNBs), master eNBs (MeNBs), secondary eNBs (SeNBs), master gNBs (MgNBs), secondary gNBs (SgNBs), base stations, access points, controllers, remote radio heads, and so on. Similarly, UEs may also be commonly referred to as mobiles, mobile stations, stations, terminals, subscribers, users, and so on. A transmission point (TP) may be used to refer to any network-side device capable of transmitting. Therefore, transmission points may refer to access nodes, eNBs, base stations, NodeBs, MeNBs, SeNBs, remote radio heads, access points, and the like. A transmit-receive point (TRP) refers to a TP that also is capable of receiving. The network-side devices may be referred to collectively as the network. In some situations, UEs, mobiles, mobile stations, terminals, subscribers, users, and so on, may also be referred to as TPs or TRPs.

As discussed previously, increasing the capabilities of a UE, e.g., maximum data rate, number of supported carriers in carrier aggregation (CA), number of antennas in multiple input multiple output (MIMO) operation, and so on, may also increase the processing (signal processing and digital processing) performed by the UE. As an illustrative example, if MIMO operation is changed from 4×4 to 8×8, the number of channels that the UE has to process quadruples. Similarly, if the number of carriers changes from one to 4, the amount of data that the UE has to process also quadruples. Increased processing by the UE increases power consumption, and thereby increases the amount of heat that the UE has to dissipate.

Figure 2:
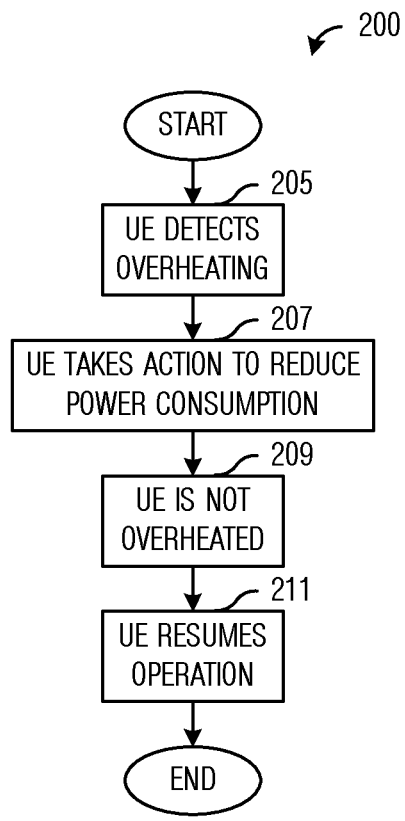
FIG. 2 illustrates a flow diagram of example operations occurring in a UE that is overheating.

FIG. 2 illustrates a flow diagram of example operations 200 occurring in a UE that is overheating. Operations 200 may be indicative of operations occurring in a UE as the UE is overheating. The UE may be overheating due to processing performed during communications.

Operations 200 begin with the UE detecting that it is overheating (block 205). The UE may be able to detect that is overheating using one or more thermal sensors, such as a thermistor, a diode, temperature detection circuitry, and so forth, located in the UE. The one or more thermal sensors may be located on or near a central processing unit(s) of the UE, on or near radio circuitry of the UE, on or near power amplifiers of the UE, on or near a battery of the UE, and so on. The UE compares a signal provided by the one or more thermal sensors against an overheating threshold to detect if the UE is overheating, for example. The UE takes action to reduce power consumption (block 207). The UE may force a reduction in the data rate by ignoring some carriers (in a CA mode), turning off some receivers (in a MIMO mode), and so on. In some situations, the data rate reduction is insufficient to reduce the heat dissipation requirements and the UE may have to enter a mode where the radio circuitry of the UE is turned off. An example of such a mode is commonly referred to as an airplane mode. An alternative measure may involve the UE detaching from the network altogether. When the UE detects that it is no longer overheating (block 209), the UE resumes operation (block 211), for example, by reactivating its radio circuitry or by reattaching to the network. It is noted however that simply resuming full data rate operation would likely cause the UE to again overheat, and that in the absence of information about the overheating, the network is likely to instruct the UE to resume full data rate operation.

In general, a UE that is experiencing overheating due to a demanding configuration (e.g., high data rates, MIMO configuration, large number of carriers, and so on) is not able to alter its capability without disrupting service. Furthermore, detaching and reattaching is unsatisfactory because although the UE capability may be changed during reattachment, any ongoing service is interrupted. The dropping of resources by the UE is a violation of technical standards, such as the Third Generation Partnership Project (3GPP) Long Term Evolution (LTE) family of technical standards, and also leads to the dropping of packets while the network continues to use the UE configuration that led to the overheating condition because the network is unaware of the condition of the UE. Such dropping of packets may cause the network to deactivate and then reactivate the affected radio resources, e.g., one or more affected carriers, thereby leading to a situation wherein resources are continually activated, deactivated, activated, deactivated, and so forth. It is noted that reducing throughput is, however, a graceful way of reducing heat dissipation requirements while retaining connectivity. Therefore, it is desirable to enable the UE to reduce its throughput in a way that will rectify the deficiencies noted above.

According to an example embodiment, when overheating occurs at a UE, the UE triggers a transfer of updated UE capability information to the network to reduce the throughput, thereby reducing the heat dissipation requirements and allowing the UE to cool down. The UE may detect the overheating in accordance with an implementation defined threshold. The UE may consider the overheating problem to be alleviated by a reduction in processing, achievable by reducing the data rate, MIMO rank, number of carriers, or a combination thereof.

As an illustrative example, the UE triggers the transfer of the updated UE capability information by transmitting an unsolicited capability update message to the network. The content of the capability update message may be the entirety of the UE capability information (that includes one or more changes to the UE capability as proposed by the UE) or a subset of the UE capability information for which a change is requested or indicated. For example, if the UE encounters an overheating condition attributable to operating a large number of carriers, the subset of the UE capability information may indicate support for a reduced number of carriers compared to the current operating UE capability. Hence, the subset of the UE capability information may include at least a reduced number of carriers, such as a number equal to the reduced number of carriers or a difference between the current number of carriers and the reduced number of carriers. The capability update message may also include a change indicator to indicate if the UE will apply the change to the UE capability unconditionally. In other words, if the change indicator is set to a first value (e.g., binary value "i") to indicate that the UE will unconditionally change the UE capability, the UE will change the capability of the UE in accordance with the updated UE capability information even if no response is received from the network. If the change indicator is set to a second value (e.g., binary value "o") to indicate that the UE will not unconditionally change the UE capability, the UE will not change the capability of the UE unless a response is received from the network agreeing to capability change or otherwise allowing the UE to make the change to the UE capability.

The capability update message may be implemented as a radio resource control (RRC) message. The capability update message may comprise a new instance of the UE Capability message; a special purpose message used to convey information about a changed UE capability; one or more additional information element (IE) in an existing message, such as a UEInformationResponse message; or a combination thereof.

As another illustrative example, the UE triggers the transfer of the updated UE capability information by transmitting an indication, such as a message or an instance of control signaling, for the network to obtain the updated UE capability information. Such an indication may be carried by a message of a control plane protocol, for instance, an RRC message. Alternatively, an indication may be carried by a medium access control (MAC) control element (CE). The indication may comprise a single bit of information indicating that the network should send a capability request, or multiple bits of information to convey additional details such as identifying the capability fields that may need to be modified. The request for the network to obtain the updated UE capability information results in the network transmitting a UE capability request message to the UE to have the UE transmit the updated UE capability information (or the subset of changed UE capability information) to the network. The request for the network to obtain the updated UE capability information may be transmitted in a separate message transmitted to the network. Alternatively, the request for the network to obtain the updated UE capability information may be piggy backed with a message already being transmitted to the network. The request for the network to obtain the updated UE capability information may be implemented as a two-valued indicator.

According to an example embodiment, the UE expects that the network will reconfigure the UE in accordance with the updated UE capability information. The reconfiguration of the UE may occur immediately or substantially immediately. As an illustrative example, the network transmits updated configuration information to the UE. The updated configuration information includes information for the connection as modified in accordance with the updated UE capability information. The updated configuration information may include the entirety of the configuration information or a subset of the configuration information that has changed due to the updated UE capability information. As another illustrative example, the network does not transmit updated configuration to the UE (due to the change indicator being set to the first value, for example) and the UE automatically changes the capability of the UE in accordance with the updated UE capability information after triggering the transfer of the updated UE capability information. As yet another illustrative example, the UE initiates a timer after triggering the transfer of the updated UE capability information and if the timer expires prior to receiving the updated configuration information from the network, the UE detaches from the network and re-attaches to the network with the updated UE capability. Alternatively, the UE automatically makes the change to the UE capability if the timer expires prior to receiving the updated configuration information from the network (as indicated by the change indicator, for example). As an example, the UE may throttle its own processing, drop monitoring of some carriers and/or antenna ports. The timer may be a supervisory timer with a duration that is implementation defined or specified in a technical standard.

In general, the reconfiguration of the connection between the UE and the network is necessary for the UE to continue operation because the UE is not able to continue for an extended amount of time using the existing connection configuration due to UE's inability to continue operating in the overheating condition. Therefore, the UE may be able to expect the reconfiguration to occur with high confidence. In an extreme situation, the UE may continue to operate as best it can and subsequently enter thermal shutdown.

Figure 3:
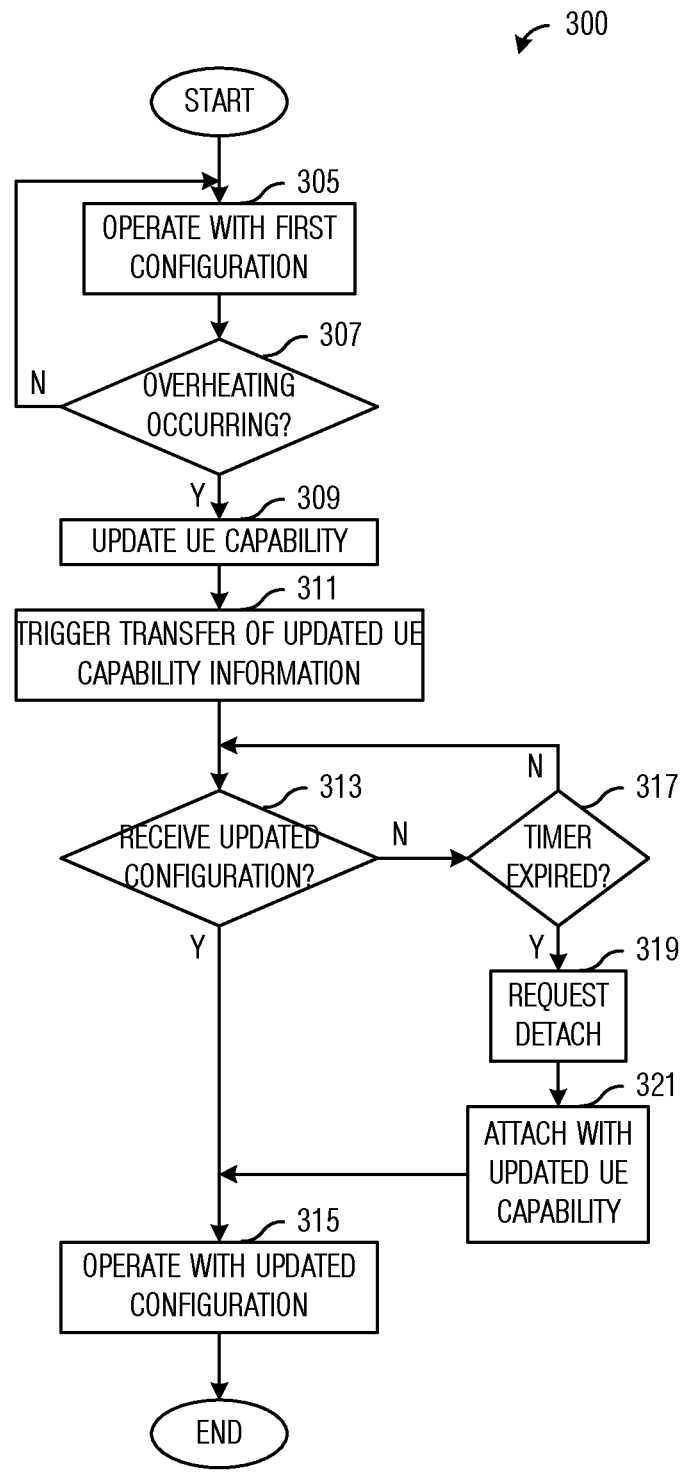
FIG. 3 illustrates a flow diagram of example operations occurring in a UE adjusting the UE capability to compensate for overheating according to example embodiments described herein.

FIG. 3 illustrates a flow diagram of example operations 300 occurring in a UE adjusting the UE capability to compensate for overheating. Operations 300 may be indicative of operations occurring in a UE as the UE adjusts the UE capability to compensate for overheating.

Operations 300 begin with the UE operating with a first configuration (block 305). The first configuration may be an initial configuration specified by the network when the UE attached to the network. Alternatively, the first configuration may be a subsequent configuration specified by the network or set by the UE after the UE had detected an earlier overheating situation. The UE performs a check to determine if the UE is overheating (block 307). As discussed previously, the check to determine if the UE is overheating may involve the comparison of a signal provided by one or more thermal sensors with an overheating threshold. The overheating threshold may be configured by the manufacturer of the UE, a reseller of the UE, an operator of the communications system, and so on.

If the UE is overheating, the UE updates the UE capability to reduce the heat generated by the UE (block 309). The UE may be able to update any one or more of the capabilities that has an impact on the overheating condition. As an illustrative example, the UE reduces the number of carriers that the UE processes in receiving (or transmitting) data, the MIMO level to reduce the number of antennas used to receive and/or transmit data, the data rate to reduce the amount of data available for processing, and so on. The UE triggers a transfer of updated UE capability information (block 311). As an illustrative example, the UE triggers the transfer of the updated UE capability information by transmitting the updated UE capability information (or a subset thereof that includes only the UE capability information that has changed) to the network. The transmission of the updated UE capability information may be in the form of an unsolicited update message. As another illustrative example, the UE triggers the transfer of the updated UE capability information by transmitting an indicator for the network to obtain the updated UE capability information. The request for the network to obtain the updated UE capability information results in the network transmitting a UE capability request message to the UE, causing the UE transmit the updated UE capability information (or the subset of changed UE capability information) to the network.

The UE may perform a check to determine if updated configuration information has been received (block 313). The updated configuration information may be received from the network. If the UE has received the updated configuration information, the UE operates with the updated configuration (block 315). If the UE has not received the updated configuration information, the UE may perform a check to determine if a timer timing the elapsed time since the transfer of the updated UE capability information has expired (block 317). The value of the timer may be configured by the manufacturer of the UE, a reseller of the UE, an operator of the communications system, a technical standard, and so on. If the timer has not expired, the UE may return to block 313 to check for the receipt of the updated configuration information. If the timer has expired, meaning that a specified amount of time has elapsed since the transfer of the updated UE capability information, the UE may request detachment from the network by transmitting a detach request (block 319) and reattach to the network using the updated UE capability (block 321). After reattachment, the UE operates with the updated configuration (block 315). In an alternative example embodiment, if the UE has not received the updated configuration information within the specified amount of time in blocks 313 and 315, the UE autonomously changes its own UE capability. In yet another alternative example embodiment, the UE automatically changes its own UE capability after triggering the transfer of the updated UE capability information. In such a situation, the UE does not have to wait to receive the updated configuration nor for the timer to expire before taking action to mitigate the overheating condition.

Figure 4:
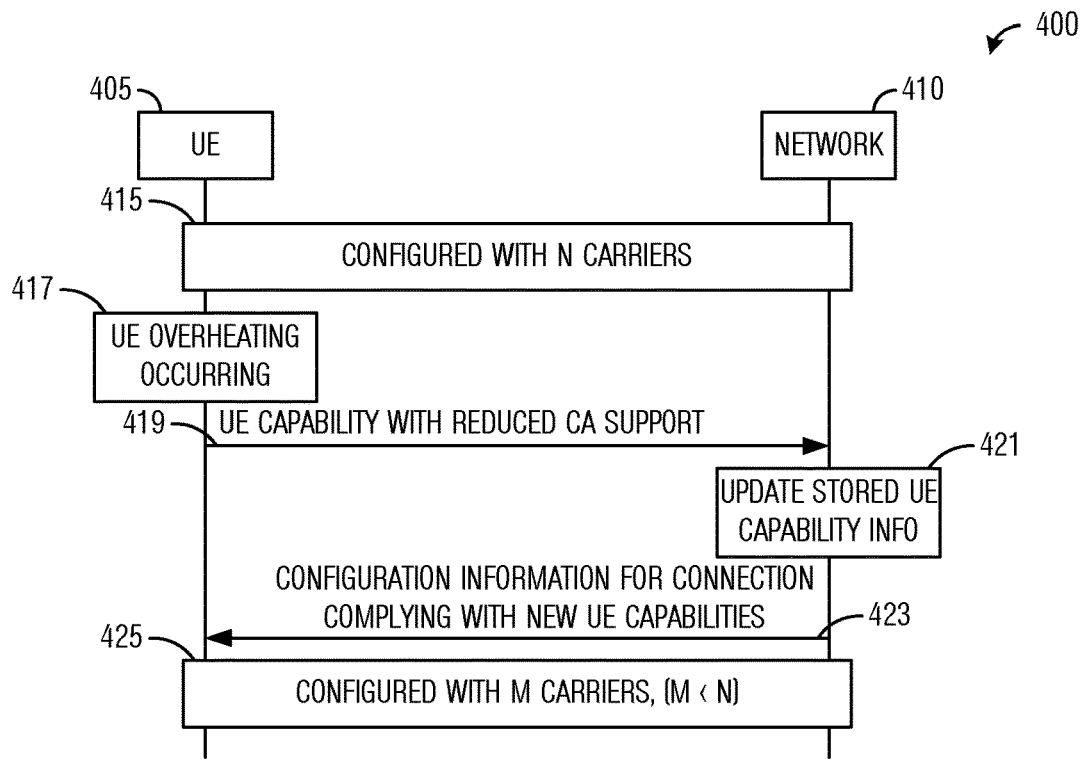
FIG. 4 illustrates a diagram displaying first example processing performed by and messages exchanged between a UE and network as the UE adjusts the UE capability to compensate for overheating according to example embodiments described herein.

FIG. 4 illustrates a diagram 400 displaying first example processing performed by and messages exchanged between a UE 405 and network 410 as UE 405 adjusts the UE capability to compensate for overheating. The interaction between UE 405 and network 410 involves a situation wherein UE 405 adjusts the number of carriers being aggregated in a connection supporting CA.

UE 405 and network 410 share a connection configured with N carriers, where N is an integer number greater than one (block 415). As UE 405 communicates with network 410, UE 405 determines that it is overheating (block 417). UE 405 adjusts the UE capability to reduce the heat generated by UE 405. As shown in FIG. 4, UE 405 triggers the transfer of the UE capability information by transmitting an unsolicited capability update message to network 410 (event 419). The capability update message may include the entirety of the UE capability information or a subset of the UE capability information that includes the changed UE capability (as proposed by the UE), such as an indication that the UE can support fewer than N simultaneously configured carriers. Network 410 updates stored UE capability information (block 421). Network 410 reconfigures the connection in accordance with the updated UE capability information and transmits configuration information for the connection to UE 405 (block 423). As an example, network 410 reduces the number of carriers being aggregated to M, where M is less than or equal to N, as indicated by the UE in event 419. UE 405 and network 410 share the connection configured with M carriers (block 425).

Figure 5:
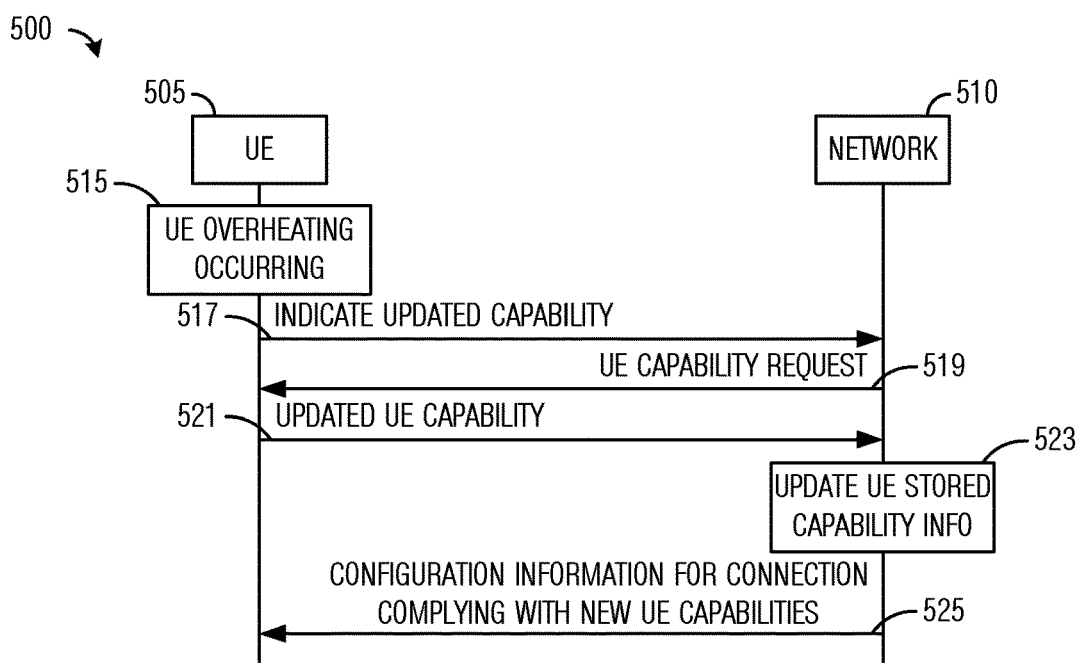
FIG. 5 illustrates a diagram displaying second example processing performed by and messages exchanged between a UE and network as the UE adjusts the UE capability to compensate for overheating according to example embodiments described herein.

FIG. 5 illustrates a diagram 500 displaying second example processing performed by and messages exchanged between a UE 505 and network 510 as UE 505 adjusts the UE capability to compensate for overheating. The interaction between UE 505 and network 510 involves a situation wherein UE 505 triggers the transfer of the UE capability information by transmitting a request for network 510 to obtain the updated UE capability information.

UE 505 and network 510 share a connection and as UE 505 communicates with network 510, UE 505 determines that it is overheating (block 515). UE 505 adjusts the UE capability to reduce the heat generated by UE 505. As shown in FIG. 5, UE 505 triggers the transfer of the UE capability information by transmitting an indication for network 510 to obtain the updated UE capability information (event 517). Network 510 transmits a UE capability request to UE 505 (event 519) and UE 505 transmits the UE capability information that includes either the entirety of the UE capability information (with the capability change as proposed by the UE) or a subset of the UE capability information that includes the changed UE capability (as proposed by the UE) to network 510 (event 521). Network 510 updates stored UE capability information (block 523). Network 510 reconfigures the connection in accordance with the updated UE capability information and transmits configuration information for the connection to UE 505 (block 525).

Figure 6:
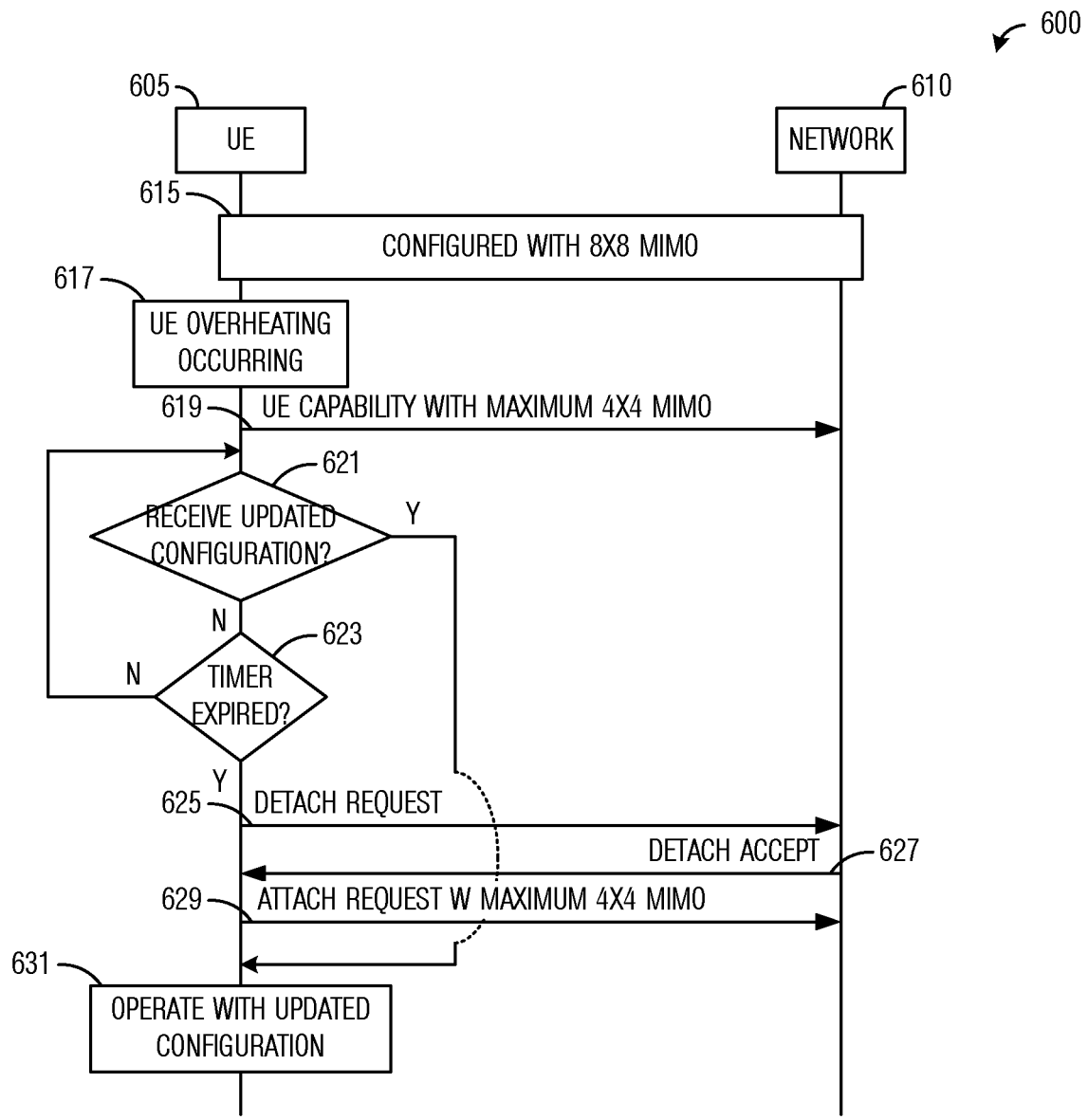
FIG. 6 illustrates a diagram displaying third example processing performed by and messages exchanged between a UE and network as the UE adjusts the UE capability to compensate for overheating while using a timer to ensure that the UE capability is changed according to example embodiments described herein.

FIG. 6 illustrates a diagram 600 displaying third example processing performed by and messages exchanged between a UE 605 and network 610 as UE 605 adjusts the UE capability to compensate for overheating while using a timer to ensure that the UE capability is changed. The interaction between UE 605 and network 610 involves a situation where the MIMO rank is adjusted by UE 605.

UE 605 and network 610 share a connection configured to support MIMO rank of 8×8 (block 615). As UE 605 communicates with network 610, UE 605 determines that it is overheating (block 617). UE 605 adjusts the UE capability (reduces the MIMO rank to 4×4, 4×2, 4×1, 2×2, 2×1, or 1×1, for example, with 4×4 being the example shown in FIG. 6) to reduce the heat generated by UE 605. It is noted that the MIMO ranks used in the discussion presented herein are for discussion purposes only and are not intended to limit either the scope or spirit of the example embodiments. UE 605 triggers the transfer of the UE capability information by transmitting an unsolicited capability update message to network 610 (event 619). The capability update message may include the entirety of the UE capability information (with the capability change as proposed by the UE) or a subset of the UE capability information that includes the changed UE capability (as proposed by the UE).

UE 605 performs a check to determine if it has received updated configuration information (block 621). If UE 605 has not received the updated configuration from network 610, UE 605 performs a check to determine if the timer has expired (block 623). If the timer has not expired, UE 605 returns to block 621 to wait for the updated configuration information. If the timer has expired, UE 605 transmits a detach request to network 610 (event 625) and receives a detach accept from network 610 (event 627). UE 605 re-attaches to network 610 with the UE capability information specifying a maximum MIMO rank of 4×4, for example (event 629). UE 605 operates in accordance with the updated configuration (block 631). As an alternative to the detach-attach sequence, UE 605 begins communicating in accordance with the UE capability information without receiving the updated configuration information from network 610. If UE 605 has received the updated configuration information in block 621, UE 605 operates in accordance with the updated configuration (block 631).

Figure 7:
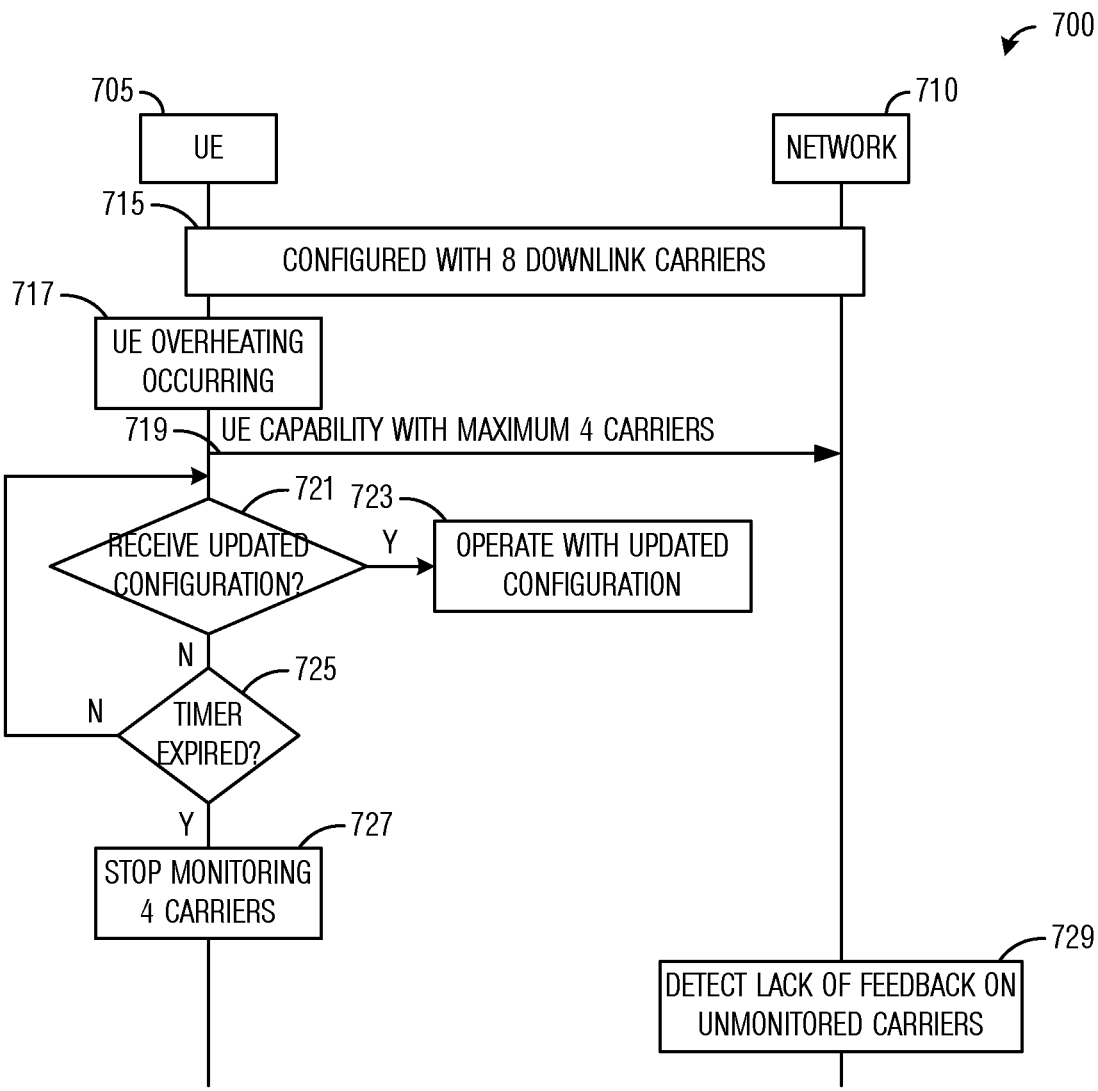
FIG. 7 illustrates a diagram displaying fourth example processing performed by and messages exchanged between a UE and network as the UE adjusts the UE capability to compensate for overheating while using a timer to ensure that the UE capability is changed according to example embodiments described herein.

FIG. 7 illustrates a diagram 700 displaying fourth example processing performed by and messages exchanged between a UE 705 and network 710 as UE 705 adjusts the UE capability to compensate for overheating while using a timer to ensure that the UE capability is changed. The interaction between UE 705 and network 710 involves a situation where the number of carriers used in CA is adjusted by UE 705.

UE 705 and network 710 share a connection configured to support CA with 8 downlink carriers (block 715). As UE 705 communicates with network 710, UE 705 determines that it is overheating (block 717). UE 705 adjusts the UE capability (reduces the number of downlink carriers to 4, 2, or 1, for example, with 4 being the example shown in FIG. 7) to reduce the heat generated by UE 705. It is noted that the number of carriers used in the discussion presented herein are for discussion purposes only and are not intended to limit either the scope or spirit of the example embodiments. UE 705 triggers the transfer of the UE capability information by transmitting an unsolicited capability update message to network 710 (event 719). The capability update message may include the entirety of the UE capability information (with the capability change as proposed by the UE) or a subset of the UE capability information that includes the changed UE capability (as proposed by the UE).

UE 705 performs a check to determine if it has received updated configuration information (block 721). If UE 705 has received the updated configuration information, UE 705 operates in accordance with the updated configuration (block 723). If UE 705 has not received the updated configuration from network 710, UE 705 performs a check to determine if the timer has expired (block 725). If the timer has not expired, UE 705 returns to block 721 to wait for the updated configuration information. If the timer has expired, UE 705 operates in accordance with the UE capability information without receiving the updated configuration information from network 710 and stops monitoring 4 of the 8 carriers (block 727).

The selection of which carriers to monitor and which carriers to not monitor may be based on which carrier is the primary carrier and which carriers are secondary carriers. For example, the UE may continue monitoring the primary carrier and cease monitoring one or more secondary carriers. Network 710 detects a lack of feedback on the carriers that are not being monitored by UE 705 (block 729). It is noted that if MIMO is also implemented and if the updated capability information indicates a reduction in MIMO rank, UE 705 provides feedback for the 4 carriers that are being monitored, where the feedback is provided at the reduced rank. Network 710 may be able to detect the reduced rank based on the feedback and reconfigure UE 705 accordingly. As an alternative to UE 705 operating in accordance with the UE capability information without receiving the updated configuration information, UE 705 detaches from network 710, and attaches to network 710 specifying a maximum number of carriers of 4.

Network 710, upon detection of an absence of feedback on the carriers unmonitored by UE 705 (block 729), may deactivate the unmonitored carriers. The deactivation of the unmonitored carriers resolves the configuration mismatch between UE 705 and network 710. Data transmitted on the unmonitored carriers will be lost however. In the situation where radio link control (RLC) acknowledgement mode (AM) is being utilized, the loss of the data is detectable and the data may be retransmitted on carriers that are being monitored by UE 705. Alternatively, network 710 may immediately attempt to bring UE 705 back into an 8 carrier configuration, leading to a likely return to the overheating condition. However, the technical standards may require UE 705 to respect the reconfiguration. According to an example embodiment, UE 705 is permitted to disregard the reconfiguration under these circumstances, which include the configuration which led to the overheating condition. According to an alternative example embodiment, UE 705 repeats the capability change process as discussed above.

In some situations, the updated configuration information from the network is not needed. As an illustrative example, the updated configuration information from the network is not needed when UE category is changed or when MIMO rank is changed but transmission mode is not changed. According to an example embodiment, in a situation wherein the updated configuration information from the network is not needed, a configuration change indicator is used to indicate that the configuration change made by the UE is accepted or not accepted. A new RRC message (e.g., a UECapabilityConfirm message) or lower layer signaling (e.g., a new MAC CE) including the configuration change indicator may be used. If the configuration change indicator is set to a first value (e.g., "1") then the configuration change made by the UE is accepted, while if the configuration change indicator is set to a second value (e.g., "0") then the configuration change made by the UE is not accepted.

Figure 8:
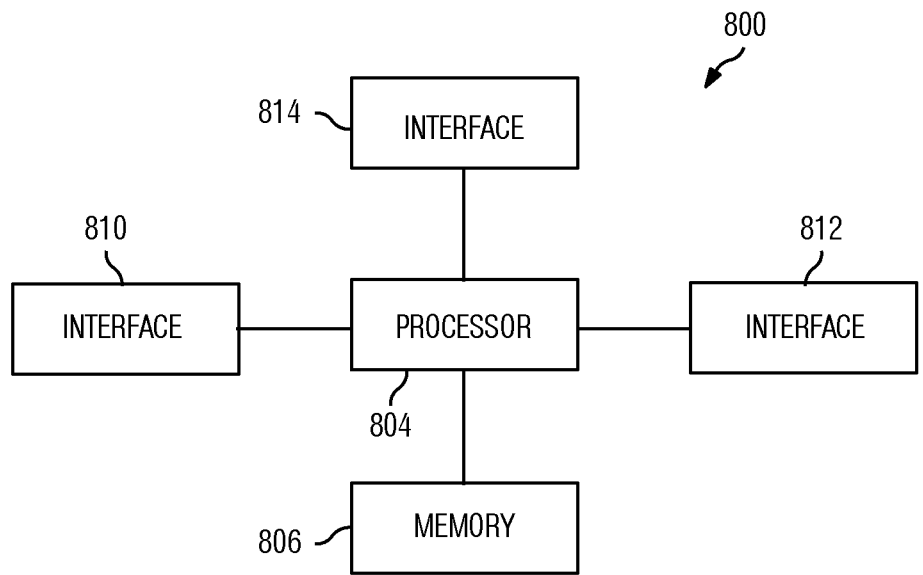
FIG. 8 illustrates a block diagram of an embodiment processing system for performing methods described herein.

FIG. 8 illustrates a block diagram of an embodiment processing system 800 for performing methods described herein, which may be installed in a host device. As shown, the processing system 800 includes a processor 804, a memory 806, and interfaces 810-814, which may (or may not) be arranged as shown in FIG. 8. The processor 804 may be any component or collection of components adapted to perform computations and/or other processing related tasks, and the memory 806 may be any component or collection of components adapted to store programming and/or instructions for execution by the processor 804. In an embodiment, the memory 806 includes a non-transitory computer readable medium. The interfaces 810, 812, 814 may be any component or collection of components that allow the processing system 800 to communicate with other devices/components and/or a user. For example, one or more of the interfaces 810, 812, 814 may be adapted to communicate data, control, or management messages from the processor 804 to applications installed on the host device and/or a remote device. As another example, one or more of the interfaces 810, 812, 814 may be adapted to allow a user or user device (e.g., personal computer (PC), etc.) to interact/communicate with the processing system 800. The processing system 800 may include additional components not depicted in FIG. 8, such as long term storage (e.g., non-volatile memory, etc.).

In some embodiments, the processing system 800 is included in a network device that is accessing, or part otherwise of, a telecommunications network. In one example, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 9:
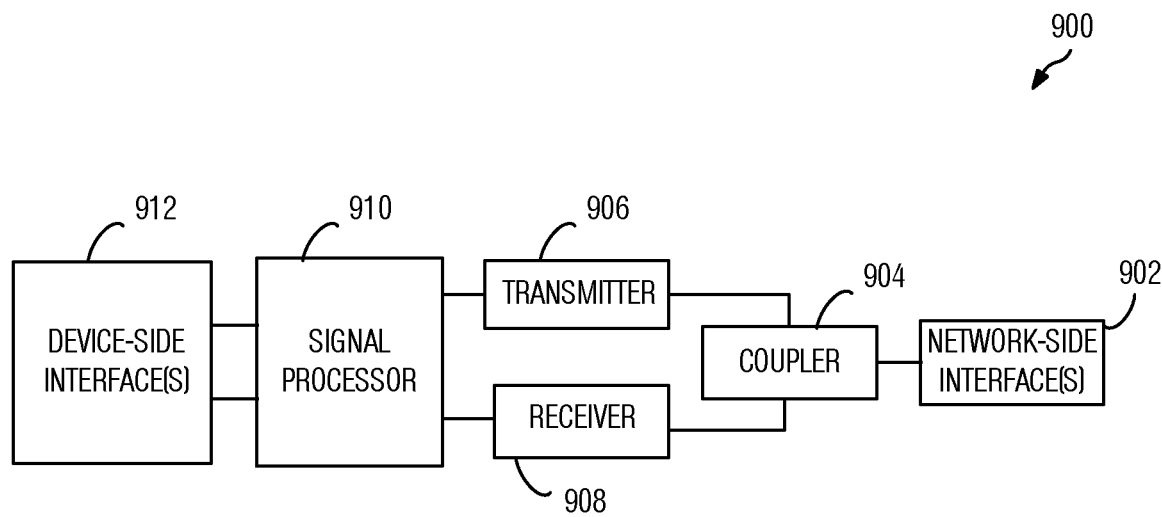
FIG. 9 illustrates a block diagram of a transceiver adapted to transmit and receive signaling over a telecommunications network according to example embodiments described herein.

In some embodiments, one or more of the interfaces 810, 812, 814 connects the processing system 800 to a transceiver adapted to transmit and receive signaling over the telecommunications network. FIG. 9 illustrates a block diagram of a transceiver 900 adapted to transmit and receive signaling over a telecommunications network. The transceiver 900 may be installed in a host device. As shown, the transceiver 900 comprises a network-side interface 902, a coupler 904, a transmitter 906, a receiver 908, a signal processor 910, and a device-side interface 912. The network-side interface 902 may include any component or collection of components adapted to transmit or receive signaling over a wireless or wireline telecommunications network. The coupler 904 may include any component or collection of components adapted to facilitate bi-directional communication over the network-side interface 902. The transmitter 906 may include any component or collection of components (e.g., up-converter, power amplifier, etc.) adapted to convert a baseband signal into a modulated carrier signal suitable for transmission over the network-side interface 902. The receiver 908 may include any component or collection of components (e.g., down-converter, low noise amplifier, etc.) adapted to convert a carrier signal received over the network-side interface 902 into a baseband signal. The signal processor 910 may include any component or collection of components adapted to convert a baseband signal into a data signal suitable for communication over the device-side interface(s) 912, or vice-versa. The device-side interface(s) 912 may include any component or collection of components adapted to communicate data-signals between the signal processor 910 and components within the host device (e.g., the processing system 800, local area network (LAN) ports, etc.).

The transceiver 900 may transmit and receive signaling over any type of communications medium. In some embodiments, the transceiver 900 transmits and receives signaling over a wireless medium. For example, the transceiver 900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 902 comprises one or more antenna/radiating elements. For example, the network-side interface 902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Figure 10:
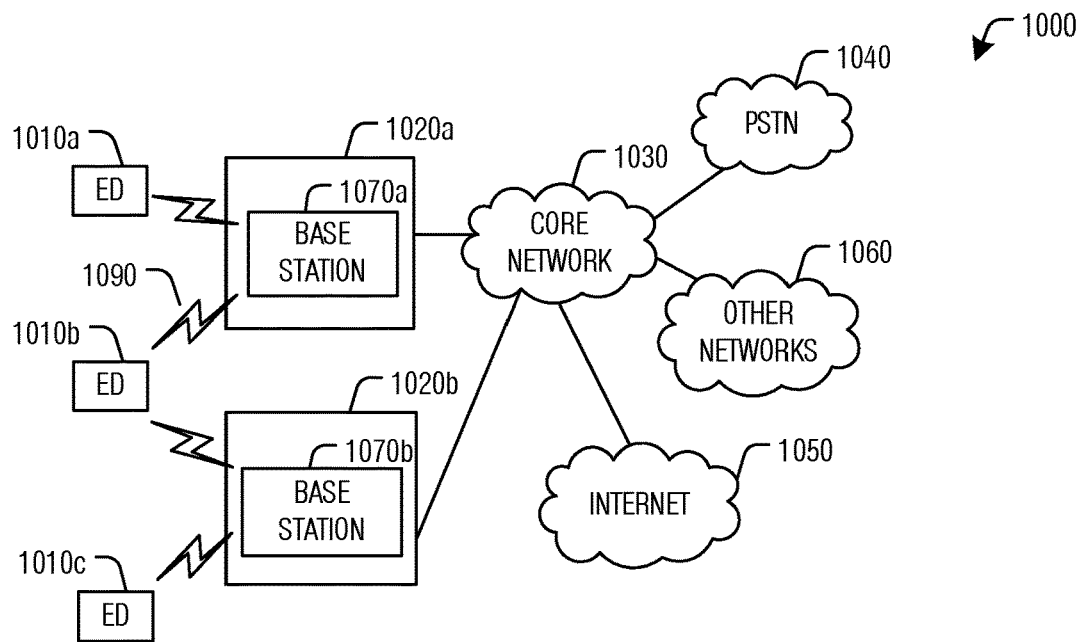
FIG. 10 illustrates an example communication system according to example embodiments described herein.

FIG. 10 illustrates an example communication system 1000. In general, the system moo enables multiple wireless or wired users to transmit and receive data and other content. The system 1000 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1000 includes electronic devices (ED) 1010a-1010c, radio access networks (RANs) 1020a-1020b, a core network 1230, a public switched telephone network (PSTN) 1040, the Internet 1050, and other networks 1060. While certain numbers of these components or elements are shown in FIG. 10, any number of these components or elements may be included in the system 1000.

The EDs 1010a-1010c are configured to operate and/or communicate in the system 1000. For example, the EDs 1010a-1010c are configured to transmit and/or receive via wireless or wired communication channels. Each ED 1010a-1010c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 1020a-1020b here include base stations 1070a-1070b, respectively. Each base station 1070a-1070b is configured to wirelessly interface with one or more of the EDs 1010a-1010c to enable access to the core network 1030, the PSTN 1040, the Internet 1050, and/or the other networks 1060. For example, the base stations 1070a-1070b may include (or be) one or more of several well-known devices, such as a base transceiver station (BTS), a NodeB, an eNodeB, a Home NodeB, a Home eNodeB, a site controller, an access point (AP), or a wireless router. The EDs 1010a-1010c are configured to interface and communicate with the Internet 1050 and may access the core network 1030, the PSTN 1040, and/or the other networks 1060.

In the embodiment shown in FIG. 10, the base station 1070a forms part of the RAN 1020a, which may include other base stations, elements, and/or devices. Also, the base station 1070b forms part of the RAN 1020b, which may include other base stations, elements, and/or devices. Each base station 1070a-1070b operates to transmit and/or receive wireless signals within a particular geographic region or area, sometimes referred to as a "cell." In some embodiments, multiple-input multiple-output (MIMO) technology may be employed having multiple transceivers for each cell.

The base stations 1070a-1070b communicate with one or more of the EDs 1010a-1010c over one or more air interfaces 1090 using wireless communication links. The air interfaces 1090 may utilize any suitable radio access technology.

It is contemplated that the system 1000 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 1020a-1020b are in communication with the core network 1030 to provide the EDs 1010a-1010c with voice, data, application, Voice over Internet Protocol (VoIP), or other services. Understandably, the RANs 1020a-1020b and/or the core network 1030 may be in direct or indirect communication with one or more other RANs (not shown). The core network 1030 may also serve as a gateway access for other networks (such as the PSTN 1040, the Internet 1050, and the other networks 1060). In addition, some or all of the EDs 1010a-1010c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 1050.

Although FIG. 10 illustrates one example of a communication system, various changes may be made to FIG. 10. For example, the communication system 1000 could include any number of EDs, base stations, networks, or other components in any suitable configuration.

Figure 11A:
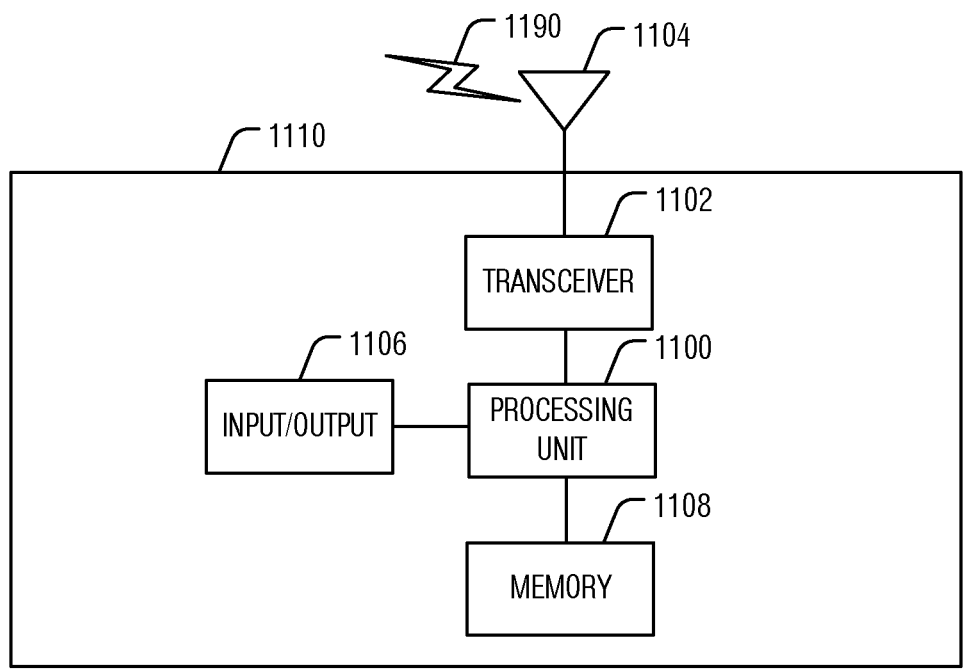
FIGS. 11A and 11B illustrate example devices that may implement the methods and teachings according to this disclosure.
Figure 11B:
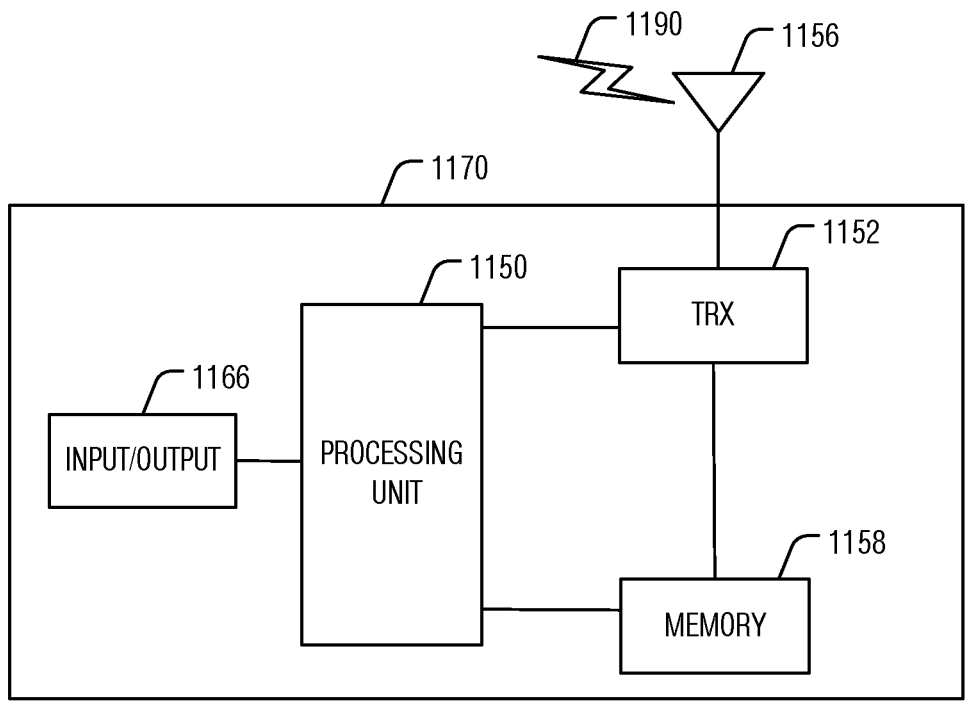

FIGS. 11A and 11B illustrate example devices that may implement the methods and teachings according to this disclosure. In particular, FIG. 11A illustrates an example ED 1110, and FIG. 11B illustrates an example base station 1170. These components could be used in the system 1000 or in any other suitable system.

As shown in FIG. 11A, the ED 1110 includes at least one processing unit 1100. The processing unit 1100 implements various processing operations of the ED 1110. For example, the processing unit 1100 could perform signal coding, data processing, power control, input/output processing, or any other functionality enabling the ED 1110 to operate in the system 1000. The processing unit 1100 also supports the methods and teachings described in more detail above. Each processing unit 1100 includes any suitable processing or computing device configured to perform one or more operations. Each processing unit 1100 could, for example, include a microprocessor, microcontroller, digital signal processor, field programmable gate array, or application specific integrated circuit.

The ED 1110 also includes at least one transceiver 1102. The transceiver 1102 is configured to modulate data or other content for transmission by at least one antenna or NIC (Network Interface Controller) 1104. The transceiver 1102 is also configured to demodulate data or other content received by the at least one antenna 1104. Each transceiver 1102 includes any suitable structure for generating signals for wireless or wired transmission and/or processing signals received wirelessly or by wire. Each antenna 1104 includes any suitable structure for transmitting and/or receiving wireless or wired signals. One or multiple transceivers 1102 could be used in the ED 1110, and one or multiple antennas 1104 could be used in the ED 1110. Although shown as a single functional unit, a transceiver 1102 could also be implemented using at least one transmitter and at least one separate receiver.

The ED 1110 further includes one or more input/output devices 1106 or interfaces (such as a wired interface to the Internet 1050). The input/output devices 1106 facilitate interaction with a user or other devices (network communications) in the network. Each input/output device 1106 includes any suitable structure for providing information to or receiving/providing information from a user, such as a speaker, microphone, keypad, keyboard, display, or touch screen, including network interface communications.

In addition, the ED 1110 includes at least one memory 1108. The memory 1108 stores instructions and data used, generated, or collected by the ED 1110. For example, the memory 1108 could store software or firmware instructions executed by the processing unit(s) 1100 and data used to reduce or eliminate interference in incoming signals. Each memory 1108 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 11B, the base station 1170 includes at least one processing unit 1150, at least one transceiver 1152, which includes functionality for a transmitter and a receiver, one or more antennas 1156, at least one memory 1158, and one or more input/output devices or interfaces 1166. A scheduler, which would be understood by one skilled in the art, is coupled to the processing unit 1150. The scheduler could be included within or operated separately from the base station 1170. The processing unit 1150 implements various processing operations of the base station 1170, such as signal coding, data processing, power control, input/output processing, or any other functionality. The processing unit 1150 can also support the methods and teachings described in more detail above. Each processing unit 1150 includes any suitable processing or computing device configured to perform one or more operations. Each processing unit 1150 could, for example, include a microprocessor, microcontroller, digital signal processor, field programmable gate array, or application specific integrated circuit.

Each transceiver 1152 includes any suitable structure for generating signals for wireless or wired transmission to one or more EDs or other devices. Each transceiver 1152 further includes any suitable structure for processing signals received wirelessly or by wire from one or more EDs or other devices. Although shown combined as a transceiver 1152, a transmitter and a receiver could be separate components. Each antenna 1156 includes any suitable structure for transmitting and/or receiving wireless or wired signals. While a common antenna 1156 is shown here as being coupled to the transceiver 1152, one or more antennas 1156 could be coupled to the transceiver(s) 1152, allowing separate antennas 1156 to be coupled to the transmitter and the receiver if equipped as separate components. Each memory 1158 includes any suitable volatile and/or non-volatile storage and retrieval device(s). Each input/output device 1166 facilitates interaction with a user or other devices (network communications) in the network. Each input/output device 1166 includes any suitable structure for providing information to or receiving/providing information from a user, including network interface communications.

Figure 12:
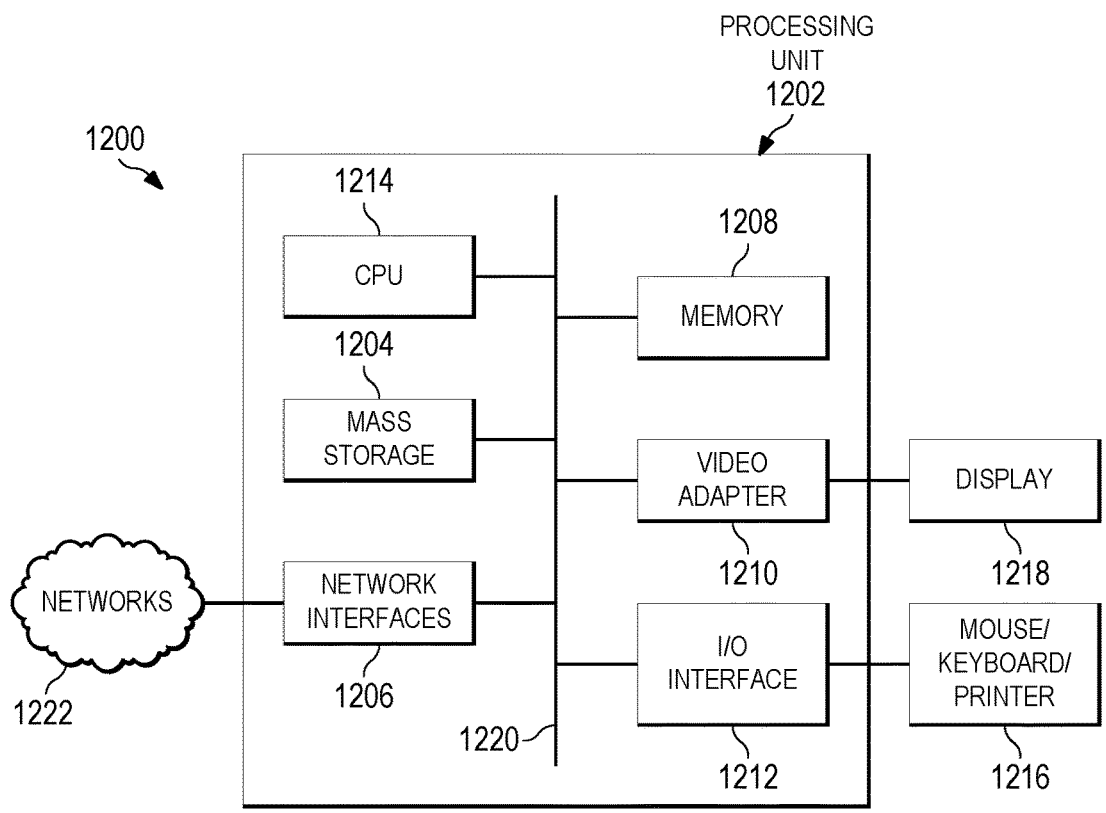
FIG. 12 is a block diagram of a computing system that may be used for implementing the devices and methods disclosed herein.

FIG. 12 is a block diagram of a computing system 1200 that may be used for implementing the devices and methods disclosed herein. For example, the computing system can be any entity of UE, access network (AN), mobility management (MM), session management (SM), user plane gateway (UPGW), and/or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1200 includes a processing unit 1202. The processing unit includes a central processing unit (CPU) 1214, memory 1208, and may further include a mass storage device 1204, a video adapter 1210, and an I/O interface 1212 connected to a bus 1220.

The bus 1220 may be one or more of any type of several bus architectures including a memory bus or memory controller, a peripheral bus, or a video bus. The CPU 1214 may comprise any type of electronic data processor. The memory 1208 may comprise any type of non-transitory system memory such as static random access memory (SRAM), dynamic random access memory (DRAM), synchronous DRAM (SDRAM), read-only memory (ROM), or a combination thereof. In an embodiment, the memory 1208 may include ROM for use at boot-up, and DRAM for program and data storage for use while executing programs.

The mass storage 1204 may comprise any type of non-transitory storage device configured to store data, programs, and other information and to make the data, programs, and other information accessible via the bus 1220. The mass storage 1204 may comprise, for example, one or more of a solid state drive, hard disk drive, a magnetic disk drive, or an optical disk drive.

The video adapter 1210 and the I/O interface 1212 provide interfaces to couple external input and output devices to the processing unit 1202. As illustrated, examples of input and output devices include a display 1218 coupled to the video adapter 1210 and a mouse/keyboard/printer 1216 coupled to the I/O interface 1212. Other devices may be coupled to the processing unit 1202, and additional or fewer interface cards may be utilized. For example, a serial interface such as Universal Serial Bus (USB) (not shown) may be used to provide an interface for an external device.

The processing unit 1202 also includes one or more network interfaces 1206, which may comprise wired links, such as an Ethernet cable, and/or wireless links to access nodes or different networks. The network interfaces 1206 allow the processing unit 1202 to communicate with remote units via the networks. For example, the network interfaces 1206 may provide wireless communication via one or more transmitters/transmit antennas and one or more receivers/receive antennas. In an embodiment, the processing unit 1202 is coupled to a local-area network 1222 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module, a triggering unit/module, an applying unit/module, a reattaching unit/module, and/or a detaching unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

The invention claimed is:

1. A method, comprising:
   determining, by a user equipment (UE), a capability limitation in the UE;
   sending, by the UE to a network entity, a radio resource control (RRC) signal carrying capability update information, the capability update information indicating a reduced operating capability of the UE in response to the capability limitation; and
   applying, by the UE, the reduced operating capability of the UE at expiration of a timer prior to or without receiving any configuration information compatible with the reduced operating capability from the network entity.

2. The method of claim 1,
   wherein the reduced operating capability includes at least one of a maximum number of multiple-input multiple-output (MIMO) layers of the UE, a maximum number of carriers for carrier aggregation of the UE, a maximum data rate of the UE, or a UE category of the UE.

3. The method of claim 1, the applying comprising:
   automatically applying the reduced operating capability of the UE.

4. The method of claim 3,
   wherein the reduced operating capability includes at least one of a maximum number of multiple-input multiple-output (MIMO) layers of the UE, a maximum number of carriers for carrier aggregation of the UE, a maximum data rate of the UE, or a UE category of the UE.

5. The method of claim 1, further comprising:
   starting, by the UE, the timer in response to the sending the RRC signal.

6. The method of claim 1, wherein the UE applies the reduced operating capability of the UE without receiving a response to the capability update information.

7. The method of claim 1, the applying the reduced operating capability of the UE comprising:
   reducing, by the UE, a maximum number of multiple-input multiple-output (MIMO) layers of the UE.

8. A user equipment (UE), comprising:
   at least one processor; and
   a non-transitory computer readable storage medium storing instructions that, when executed by the at least one processor, cause the UE to perform operations including:
      determining a capability limitation in the UE;
      sending, to a network entity, a radio resource control (RRC) signal carrying capability update information, the capability update information indicating a reduced operating capability of the UE in response to the capability limitation; and
      applying the reduced operating capability of the UE at expiration of a timer prior to or without receiving any configuration information compatible with the reduced operating capability from the network entity.

9. The UE of claim 8,
   wherein the reduced operating capability includes at least one of a maximum number of multiple-input multiple-output (MIMO) layers of the UE, a maximum number of carriers for carrier aggregation of the UE, a maximum data rate of the UE, or a UE category of the UE.

10. The UE of claim 8, the applying comprising:
    automatically applying the reduced operating capability of the UE.

11. The UE of claim 10,
    wherein the reduced operating capability includes at least one of a maximum number of multiple-input multiple-output (MIMO) layers of the UE, a maximum number of carriers for carrier aggregation of the UE, a maximum data rate of the UE, or a UE category of the UE.

12. The UE of claim 8, the operations further comprising:
    starting the timer in response to the sending the RRC signal.

13. The UE of claim 8, wherein the UE applies the reduced operating capability of the UE without receiving a response to the capability update information.

14. A non-transitory computer-readable medium having instructions stored thereon that, when executed by a user equipment (UE), cause the UE to perform operations, the operations comprising:
    determining a capability limitation in the UE;
    sending, to a network entity, a radio resource control (RRC) signal carrying capability update information, the capability update information indicating a reduced operating capability of the UE in response to the capability limitation; and
    applying the reduced operating capability of the UE at expiration of a timer prior to or without receiving any configuration information compatible with the reduced operating capability from the network entity.

15. The non-transitory computer-readable medium of claim 14,
- wherein the reduced operating capability includes at least one of a maximum number of multiple-input multiple-output (MIMO) layers of the UE, a maximum number of carriers for carrier aggregation of the UE, a maximum data rate of the UE, or a UE category of the UE.

16. The non-transitory computer-readable medium of claim 14, the applying comprising:
- automatically applying the reduced operating capability of the UE.

17. The non-transitory computer-readable medium of claim 16,
- wherein the reduced operating capability includes at least one of a maximum number of multiple-input multiple-output (MIMO) layers of the UE, a maximum number of carriers for carrier aggregation of the UE, a maximum data rate of the UE, or a UE category of the UE.

18. The non-transitory computer-readable medium of claim 14, the operations further comprising:
- starting the timer in response to the sending the RRC signal.

19. The non-transitory computer-readable medium of claim 14, wherein the UE applies the reduced operating capability of the UE without receiving a response to the capability update information.

* * * * *

UNITED STATES PATENT AND TRADEMARK OFFICE
CERTIFICATE OF CORRECTION

PATENT NO. : 12,295,072 B2
APPLICATION NO. : 18/301317
DATED : May 6, 2025
INVENTOR(S) : Tenny et al.

Page 1 of 1

It is certified that error appears in the above-identified patent and that said Letters Patent is hereby corrected as shown below:

In the Specification

In Column 7, Line 11, delete "value "i")" and insert -- value "1") --.

In Column 7, Line 16, delete "value "o")" and insert -- value "0") --.

In Column 13, Line 55, delete "moo" and insert -- 1000 --.

Signed and Sealed this
Seventeenth Day of June, 2025

Coke Morgan Stewart
*Acting Director of the United States Patent and Trademark Office*